United States Patent
Kano et al.

(10) Patent No.: US 7,896,411 B2
(45) Date of Patent: Mar. 1, 2011

(54) IMPACT ABSORBING MEMBER FOR VEHICLE

(75) Inventors: Mitsutoshi Kano, Toyota (JP); Makoto Nakanishi, Toyota (JP); Kenji Tamura, Osaka (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 133 days.

(21) Appl. No.: 12/254,323

(22) Filed: Oct. 20, 2008

(65) Prior Publication Data

US 2009/0115208 A1 May 7, 2009

(51) Int. Cl.
*B60R 19/34* (2006.01)

(52) U.S. Cl. .................................. 293/133; 296/187.09

(58) Field of Classification Search ............ 296/187.01, 296/187.03, 187.09, 187.1, 193.09; 293/132, 293/133

See application file for complete search history.

(56) References Cited

U.S. PATENT DOCUMENTS

| | | | |
|---|---|---|---|
| 6,705,653 B2 * | 3/2004 | Gotanda et al. | 293/132 |
| 7,252,314 B2 * | 8/2007 | Tamura et al. | 293/133 |
| 2006/0202493 A1 * | 9/2006 | Tamura et al. | 293/133 |
| 2008/0030031 A1 * | 2/2008 | Nilsson | 293/133 |
| 2009/0085362 A1 * | 4/2009 | Terada et al. | 293/132 |

FOREIGN PATENT DOCUMENTS

WO     WO 2005/010398 A1     2/2005

\* cited by examiner

*Primary Examiner*—Patricia L Engle
(74) *Attorney, Agent, or Firm*—Finnegan, Henderson, Farabow, Garrett & Dunner, LLP

(57) ABSTRACT

Of side wall portions (60a, 60b) of a tubular body portion (52) mainly constituting an impact absorbing member (50), a wider side wall portion (60a) on the vehicle inner side is provided with a projecting rib (70) projects outward in the direction perpendicular to the axis of the body portion. The projecting rib (70) extends from an axial end (52a) adjacent to a mounting plate (54) and parallel to the axial direction of the body portion. Therefore, even when an impact load is applied to the impact absorbing member (50) in an oblique direction with respect to the vehicle to generate a moment load, the existence of the projecting rib (70) prevents the impact absorbing member from falling down laterally. Accordingly, excellent impact-absorbing properties are stably obtained. The projecting rib (70) is formed not to reach the load input side, i.e., the axial end (52b) adjacent to a mounting plate (56), where collapse starts. Therefore, no load increase occurs in a crash initial stage to well maintain impact-energy-absorbing properties.

14 Claims, 14 Drawing Sheets

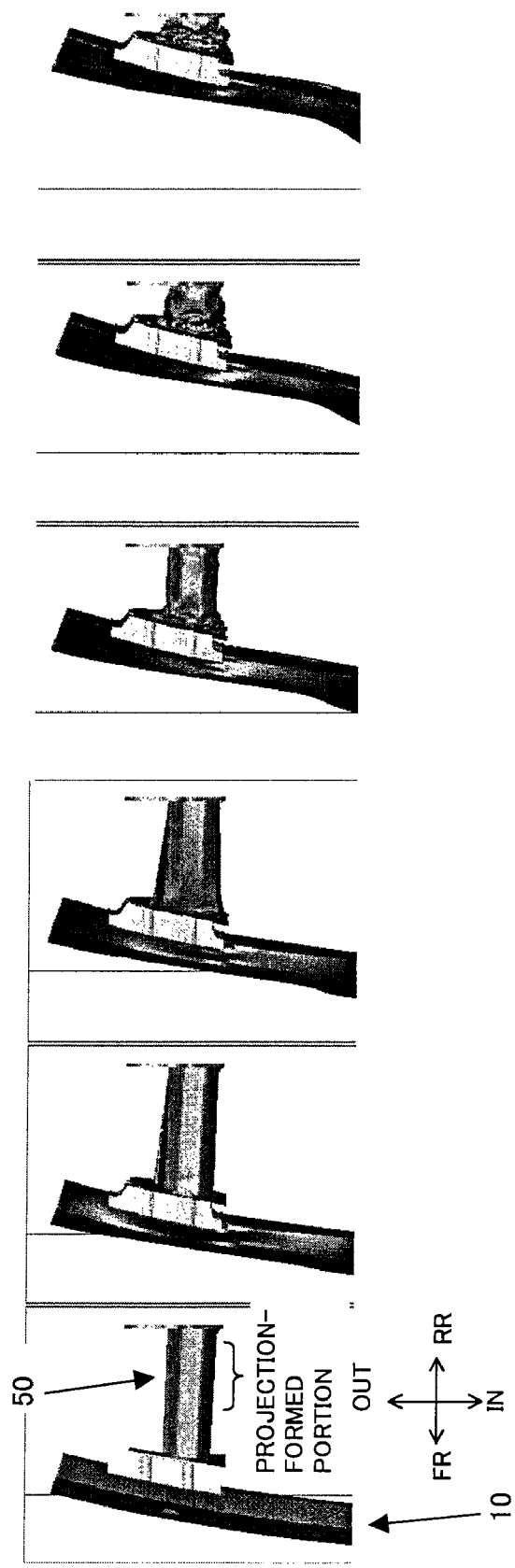

UPPER DIRECTION
FRONT DIRECTION
WIDTH DIRECTION

40% OFFSET RIGID BARRIER

40% OFFSET MOVING BARRIER

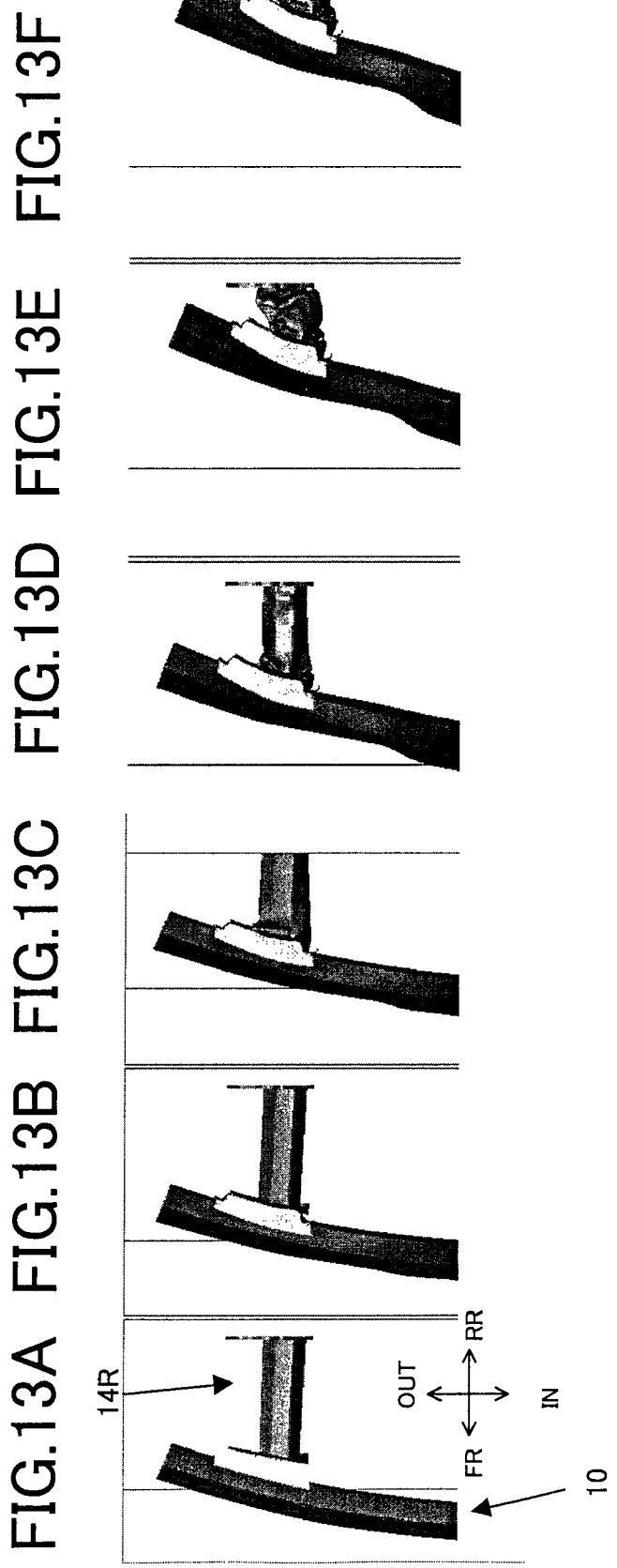

IMPACT ABSORBING MEMBER FOR VEHICLE

BACKGROUND OF THE INVENTION

1. Field of the Invention

The present invention relates to an impact absorbing member for vehicle, for use in a vehicle for absorbing an impact applied to the vehicle. More specifically, the present invention related to a technique, applied to the case where a vehicle is subjected to an impact load obliquely from the front or back thereof, so as to prevent an impact absorbing member from falling down laterally and losing the impact-absorbing properties.

2. Description of the Related Art

As an impact absorbing member for vehicle, the following one is known. This impact absorbing member for vehicle has a tubular shape, and is provided with a concave groove at a portion of its side wall. The concave groove concaves inward in a direction orthogonal to an axial direction of the tubular shape (the direction perpendicular to the axis), and extends parallel to the axial direction. This impact absorbing member for vehicle is disposed between a vehicle body side member and a bumper member in such a manner that the axial direction thereof is coincident with an fore and aft direction of a vehicle. When subjected to a compressive load, the impact absorbing member collapses like an accordion in the axial direction, thereby absorbing the impact energy (See Patent Document 1: WO 2005/010398).

FIGS. 9A and 9B explain one example of such an impact absorbing member for vehicle. FIG. 9A is a schematic plan view showing the vicinity of a bumper beam 10 on the vehicle front side, as viewed from the top of a vehicle. Right-hand and left-hand side members 12R and 12L are provided with, at the front ends thereof, crash boxes 14R and 14L, respectively, as impact absorbing members. The bumper beam 10 is fixed on the right-hand and left-hand crash boxes 14R and 14L at such ends.

FIG. 9B shows section IXA-IXA of FIG. 9A, i.e., the section near the right-hand mounting position. The crash box 14R comprises a body portion 20 having a tubular shape and a pair of mounting plates 22 and 24 integrally weld-fixed to both axial ends of the body portion 20, respectively. Via these mounting plates 22 and 24, the crash box 14R is fixed to the side member 12R and the bumper beam 10 with a non-illustrated bolt or the like.

FIGS. 10A and 10B specifically explain an example of the body portion 20 of the above crash box 14R. FIG. 10A is a perspective view, and FIG. 10B is a front view. A section perpendicular to the axial direction of the tubular body portion 20 (see FIG. 10B) has a basic shape of an elongated shape having a pair of parallel longer sides obtained by linear interpolation (connection) between two adjoining sides (a vertically elongated octagonal shape, in case of FIG. 10B). A pair of wider side wall portions 30 giving the longer sides of the basic shape is each provided with a concave groove 32 at middle portion in the width direction thereof, i.e., the vertical direction in FIG. 10A and FIG. 10B (the center portion in FIG. 10B). The concave groove 32 concaves inward and extends parallel to the axial direction.

The body portion 20 is disposed between the side member 12R and the bumper beam 10 in such a manner that the pair of the wider side wall portions 30 are located in the width direction of the vehicle. The body portion 20 may be integrally formed by hydrostatic forming using a tubular pipe material, i.e., a single member or the like. However, the body portion 20 shown in FIGS. 10A and 10B is formed of a pair of pressed plate materials 26 and 28. This is a polygonal tube having a vertically elongated shape, obtained by integrally weld-fixing the pair of pressed plate materials 26 and 28 having been bent into an M shape, in a state that both side portions of one pressed plate material are superposed on both side portions of the other pressed plate material.

When such a crash box 14R is subjected to an impact applied from the front of the vehicle and receives a compressive load F, the body portion 20 collapses like an accordion as shown in FIG. 9C. The deformation at this time absorbs the impact energy, thus relieving the impact applied to the side member 12R and like structural members of the vehicle. The accordion-like collapse is a phenomenon caused by continuous buckling of the body portion 20 at a large number of portions axially spaced from one another (L-shaped folds in FIG. 9C). Buckling usually starts from side of the bumper beam 10, i.e. the input side, and progresses toward the vehicle body side with time.

The bumper beam 10 is symmetrical, and has the same structure at the left-hand mounting position. Further, this bumper beam 10 functions as a bumper reinforcement (reinforcing member) and a mounting member, and a bumper body 16 made of synthetic resin or the like can be integrally mounted thereon. The bumper beam 10 corresponds to the bumper members and side members 12R and 12L correspond to the vehicle body side members, of the present invention, respectively.

By the way, in recent years, for crash tests for evaluation of damages on vehicles, a test method using an oblique barrier assuming collisions into vehicles from oblique directions have been adopted. According to this test method, as shown in FIG. 11A, a vehicle is offset-crashed into a rigid barrier 42 having a crash surface 40 at a predetermined angle θ1 (e.g., 10°), at a predetermined vehicle speed V1 (e.g., 15 km/h). Further, as shown in FIG. 11B, a crash cart 46 provided with a barrier 44 at its front end is crashed into a corner of the vehicle from a direction at a predetermined angle θ2 (e.g., 10°) at a predetermined speed V2 (e.g., 15 km/h).

According to such a test method, for example, as shown in FIG. 12, when a load F acts obliquely to the axial direction of the crash box 14R and generates a moment load M, the crash box 14R often falls down toward the vehicle inner side (the left in FIG. 12). As a result, original impact-energy absorbing properties of the crash box 14R may be impaired. FIG. 12 is a plan view showing the right half of the bumper beam 10.

FIGS. 13A to 13F show a result of FEM simulation of collapse process of the crash box 14R upon a crash test conducted using a 40% offset rigid barrier shown in FIG. 11A under conditions of angle θ1=10°, and vehicle speed V1=15 km/h. The crash box 14R falls down laterally in the phase shown in FIG. 13E.

FIG. 5A is a graph showing a relation between compression stroke and load. FIG. 5B is a graph showing a relation between compression stroke and absorbed energy. In FIG. 5A and FIG. 5B, a dashed line shows the calculated results of the load and absorbed energy during the crash test. As is obvious from these data, the load starts falling approximately when the compression stroke exceeds ST1. This suggests that it was around this point on the graph when the crash box fell down laterally.

Against these problems, measures as shown in FIG. 14A and FIG. 14B can be conceived, for example, although this has been unknown. According to the measure shown in FIG. 14A, a crash box 14R is rotated at 90° around an axis thereof to have a horizontally elongated shape, so as to be prevented from falling down laterally. This structure requires no great modification to the crash box 14R itself, and can thus be easily applied. However, due to the increased dimension in the width direction of the vehicle, the mountability of the crash box 14R on a vehicle is degraded. As a result, a substantial modification in design may be required, such as an increase in the width dimension of the side member 12R, etc.

According to the measure shown in FIG. 14B, an auxiliary member 48 for canceling the moment load M explained in FIG. 12 is disposed parallel to the body portion 20 and between the mounting plates 22 and 24. This causes problems such as an increase in the number of components followed by increases in cost and weight, the reduction of productivity, a mountability deterioration of the entire components on the vehicle, and the like.

SUMMARY OF THE INVENTION

The present invention was accomplished against the background as above, and has an object to provide an impact absorbing member for vehicle, which is prevented from falling down laterally even when an impact load is applied thereto in an oblique direction with respect to the vehicle, so that excellent impact-absorbing properties are stably obtained, without requiring a dimensional increase in the width direction of the vehicle or the additional provision of an auxiliary member.

For achieving the above object, a first aspect of the invention relates to an impact absorbing member for vehicle including a tubular body portion, the tubular body portion being provided with, at a part of a side wall thereof, a concave groove concaving inward in a direction perpendicular to an axis of the tubular body portion and extending parallel to an axial direction thereof. The impact absorbing member for vehicle, disposed between a vehicle body side member and a bumper member such that the axial direction of the tubular body portion is coincident with an fore and aft direction of a vehicle, collapses like an accordion in the axial direction when receiving a compressive load to absorb an impact energy.

The impact absorbing member for vehicle is characterized by that the tubular body portion is provided with, on the side wall located in a width direction of the vehicle, a projecting rib projecting outward in the direction perpendicular to the axis of the tubular body portion, the projecting rib extending parallel to the axial direction of the tubular body portion from one axial end adjacent to the vehicle body side member, without reaching other axial end adjacent to the bumper member.

In a second aspect of the invention, in the first aspect of the invention, the projecting dimension of the projecting rib continuously decreases from the one axial end of the tubular body portion adjacent to the vehicle body side member toward the other axial end adjacent to the bumper member.

In a third aspect of the invention, in the first aspect or the second aspect of the invention, the projecting dimension of the projecting rib is constant throughout the length thereof.

In the impact absorbing member for vehicle according to the first aspect, the tubular body portion is provided with the projecting rib on its side wall, at a portion located in the width direction of the vehicle, strictly speaking at any position in the width direction. The side wall usually extends in a direction perpendicular to the width direction of the vehicle, that is, in a fore and aft direction or in an up-down direction of the vehicle. The projecting rib projects outward in the direction perpendicular to the axis of the tubular body portion and extends parallel to the axis direction from one axial end adjacent to the vehicle body side member.

Therefore, even when the impact load is applied to the impact absorbing member for vehicle in an oblique direction with respect to the vehicle to generate a moment load, the existence i.e. provision of the projecting rib prevents the impact absorbing member for vehicle from falling down laterally. Accordingly, excellent impact-absorbing properties are stably obtained. This only requires formation of the projecting rib on the side wall of the tubular body portion. Accordingly, as compared with cases where the width directional dimension of the vehicle is increased or the auxiliary member is additionally provided, problems such as an increase in the number of components, the mountability deterioration on the vehicle, the increase in weight, the reduction of productivity and the like of the impact absorbing member for vehicle are alleviated or eliminated.

The projecting rib is formed without reaching i.e. so as not to reach the other axial end of the impact absorbing member for vehicle adjacent to the load input side, where the impact absorbing member starts collapsing, that is, the other axial end adjacent to the bumper member. Therefore, the load increase in the initial stage of crash can be avoided, so that the impact-energy absorbing properties (varying properties in the load and absorbed energy relative to the compression stroke) are well maintained.

According to the second aspect, the projecting dimension of the projecting rib in the direction perpendicular to the axis decreases continuously in the direction from the one axial end adjacent to the vehicle body side member to the other axial end adjacent to the side of the bumper member. Therefore, the compressive load upon collapse does not suddenly change, so that desired impact-energy absorbing properties are maintained even better.

The impact absorbing member for vehicle of the present invention may be applied to a mounting portion for a bumper member mounted on the vehicle front side, as well as a mounting portion for a bumper member mounted on the vehicle rear side. The impact absorbing member may be applied to the both mounting portions, and to either one mounting portion.

With respect to the shape of the bumper member in the longitudinal direction, that is, the shape in a planar view as seen from the top of the vehicle, for example, the front bumper preferably has a smoothly curved shape with a central part projecting forward. However, various other modes can be also adopted. For example, the planar view shape may have substantially linear, and can be inclined backward or curved at the both longitudinal ends.

The impact absorbing member for vehicle of the present invention is disposed such that the axial direction of the tubular body portion is coincident with the fore and aft direction of the vehicle. The axial direction of the body portion does not necessarily have to be strictly coincident with the fore and aft direction of the vehicle. Depending on the shape of a bumper member and the like, the axial direction of the tubular body portion may be inclined horizontally or vertically with respect to the fore and aft direction of the vehicle.

The impact absorbing member for vehicle of the present invention comprises a body portion having, for example, a tubular shape, and a pair of mounting plates integrally fixed to the axial ends of the body portion. The tubular body portion has, for example, configuration such that a section perpendicular to the axis thereof has a flat hexagonal or higher polygonal shape having at least one pair of substantially parallel sides. However, the cross-sectional shape of the tubular body portion may be square, rectangle, or simple regular polygon. The cross section may also have curved shape such as a circular, elliptic, or like, partially or over the entire circumference. In such a polygonal section, a pair of side walls constructing mutually parallel two sides are each provided with a concave groove extending in the axial direction. The concave groove concaves inward in the direction perpendicular to the axis.

The tubular body portion has a basic sectional shape of a flat octagon (a shape formed by cutting off or trimming the four corners of a rectangle), for example. Such a cross section has a pair of longer sides substantially parallel to the major axis direction thereof, and a concave groove is formed on each of the paired longer sides at a substantially intermediate or central portion thereof. The pair of concave grooves are substantially symmetric relative to the major axis. As a result, the tubular body portion as a whole has an 8-shaped or gourd-shaped section.

However, various other modifications can be employed. For example, two or more concave grooves can be formed in each of the pair of longer sides. Further, the basic cross-sectional shape can have a flat hexagon in which both ends of the body portion in the major axis direction are triangled.

The tubular body portion is formed using a thin plate material by press-processing a pair of half-shapes or shells each having a substantially U-shaped or M-shaped section as halved along a plane that contains a major axis and is substantially parallel to the axial direction, for example. Subsequently, the pair of half-shapes are integrally weld-bonded in a state that both circumferential ends on the open side of one half-shape are superposed on or butted to both circumferential ends on the open side of the other half-shape, thereby forming a tubular shape. However, various other modifications can be employed. For example, a predetermined sectional shape can be obtained by subjecting a cylindrical, square, or like tubular pipe material, i.e., a single member, to hydrostatic forming.

In case that the cross section of the tubular body portion has an elongated shape, for example, one or more pairs of concave grooves are formed substantially symmetrically with respect to a plane containing the center line in the longitudinal direction (major axis) of such an elongated shape. However, the concave grooves are suitably formed depending on the sectional shape of the tubular shape, etc. For example, a single groove may be formed around the axis of the tubular body portion. Also, a plurality of grooves may be formed around the axis at predetermined intervals, etc.

One or more projecting ribs are formed on at least one of the right-hand and left-hand side wall portions located in the width direction of the vehicle at least in the state where the impact absorbing member is mounted on a vehicle. A projecting rib can be formed on each of the both side wall portions located along the width direction of the vehicle, for example. When the concave groove is formed on the side wall at a substantially intermediate portion thereof in the width direction, a pair of projecting ribs may be formed on the both sides of each concave groove. In this case, the right-hand and left-hand side wall portions have four projecting ribs in total.

The projecting rib is preferably formed such that the projecting dimension thereof decreases continuously toward the other axial end adjacent to the bumper member, as in the second aspect. The projecting dimension may also be constant or gradually decrease. In the second aspect, the projecting rib may also be formed throughout the axial length of the tubular shape, for example, such that the projecting dimension continuously decreases to reach zero at the other axial end adjacent to the bumper member. As defined in the first aspect, the condition that "the projecting rib does not reach the other axial end of the tubular body portion adjacent to the bumper member" requires at least the projecting dimension to be zero at the other axial end adjacent to the bumper member.

The above-described projecting rib is preferably formed to extend over a length greater than half the axial length of the tubular body portion, in order to prevent the impact absorbing member from falling down laterally, even when an impact load is obliquely applied thereto, irrespective of the induced moment load. Depending on the shape of the bumper member or the like, the direction of a moment load may be constant. In this case, in order to prevent the impact absorbing member from falling down laterally by such a moment load, the projecting rib may be formed only on either of the right-hand and left-hand side wall portions of the tubular body portion, for example, at the side wall portion on the side to which the impact absorbing member will fall down laterally.

The cross-sectional shape of the projecting rib is, for example, a trapezoid having a width dimension decreasing toward the projecting end. However, various other modifications can be employed. For example, the shape may be a rectangle or a square having a constant width dimension regardless of the projecting dimension. A partially arc-shaped, for example, semicircular, semi-elliptic, etc. can be employed. The cross-sectional shape of the projecting rib including the projecting dimension may be continuously or intermittently changed in the axial direction of the tubular body portion.

As with the above-described projecting rib, various other modifications can be employed for the cross-sectional shape of the concave groove. For example, although the shape may be a trapezoid having a width dimension decreasing inward in the direction perpendicular to the axis, the shape may also be a rectangle or a square having a constant width dimension regardless of the depth.

Excessively large projecting dimension h of the projecting rib results in excessively high strength and rigidity, which may hinder stable, repetitive buckling (collapse). Therefore, the projecting dimension h is preferably selected to be 5 mm or less at maximum, although it depends on the sectional shape and the plate thickness of the tubular body portion, etc.

Examples of suitable materials for the tubular body portion include rolled steel plates, carbon steel pipes, and the like. Various other metal plate materials and pipe materials achieving desired impact-energy absorbing properties upon accordion-like collapse, may also be employed. The projecting rib for preventing the impact absorbing member from falling down laterally can be formed by drawing or bending using a press, hydrostatic forming, or the like.

According to the third aspect, in the state where the impact absorbing member is mounted on the vehicle, the wider side wall portions located in the width direction of the vehicle are each provided with both the concave groove and the projecting rib. However, various other modifications can be employed. When carrying out the invention, for example, in the state where the impact absorbing member is mounted on the vehicle, the structure may be such that the concave grooves are formed in the vertically opposed side wall portions, and the projecting ribs are formed on the horizontally opposed side wall portions.

BRIEF DESCRIPTION OF THE DRAWINGS

FIGS. 1A, 1B and 1C are figures explaining an impact absorbing member for vehicle according to one embodiment of the present invention, in which FIG. 1A is a schematic plan view showing one mounting mode, FIG. 1B is a perspective view of a body portion of the impact absorbing member for vehicle, and FIG. 1C is a front view of the body portion;

FIGS. 2A and 2B are figures explaining an operation of a moment load on the impact absorbing member for vehicle of FIGS. 1A, 1B and 1C, in which FIG. 2A shows a case of the crash surface being oblique to a vehicle body, and FIG. 2B shows a case of the crash surface being perpendicular to a vehicle body;

FIGS. 4A to 4F are figures explaining simulation results of collapse process obtained by FEM analysis;

FIGS. 6A and 6B are figures explaining another embodiment of the present invention, in which FIG. 6A is a perspective view corresponding to FIG. 1B, and FIG. 6B is a front view corresponding to FIG. 1C;

FIGS. 8A and 8B are figures explaining still yet another embodiment of the present invention, in which FIG. 8A is a perspective view corresponding to FIG. 1B, and FIG. 8B is a front view corresponding to FIG. 1C;

FIGS. 9A, 9B and 9C are figures explaining a conventional impact absorbing member for vehicle, in which FIG. 9A is a schematic plan view showing one specific mounting mode, FIG. 9B is an IXA-IXA sectional view in FIG. 9A, and FIG. 9C shows the conventional impact absorbing member collapsed like an accordion-like shape by a compressive load F;

FIGS. 10A and 10B are figures showing a body portion of the impact absorbing member for vehicle of FIGS. 9, in which FIG. 10A is a perspective view corresponding to FIG. 1B, and FIG. 10B is a front view corresponding to FIG. 1C;

FIGS. 13A to 13F are figures showing simulation results of collapse process obtained by FEM analysis, relative to the crash test of FIG. 11A using the conventional impact absorbing member for vehicle of FIGS. 10A and 10B, and corresponds to FIGS. 4A to 4F.

DESCRIPTION OF THE PREFERRED EMBODIMENTS

Hereinafter, embodiments of the present invention are described in detail with reference to the figures.

First Embodiment

Figure 1A:
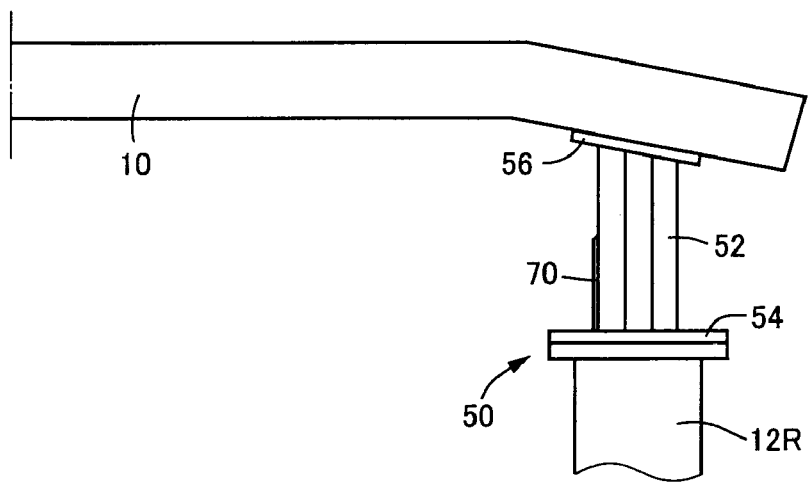
Figure 1B:
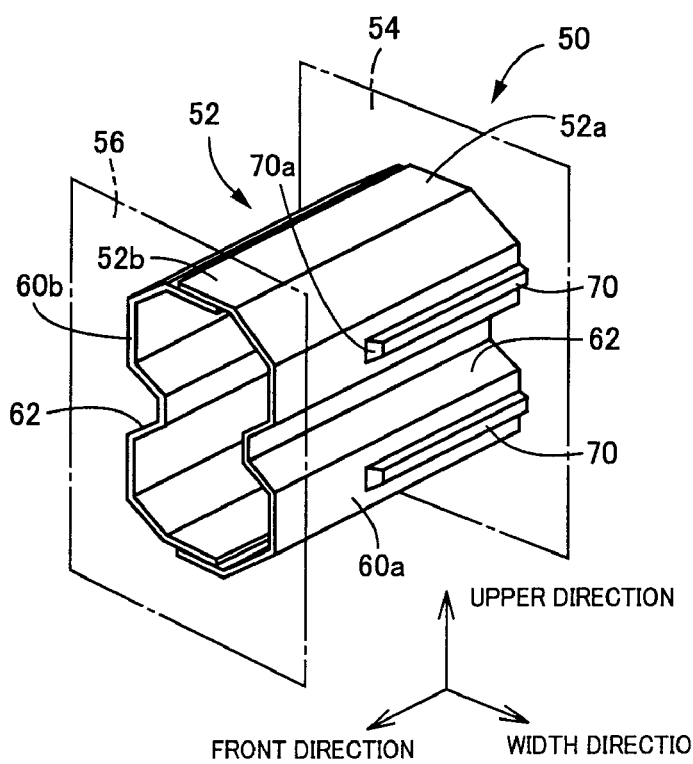
Figure 1C:
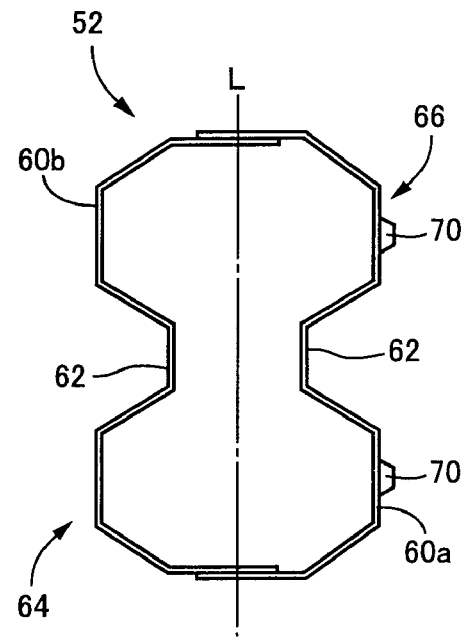
Figure 9A:
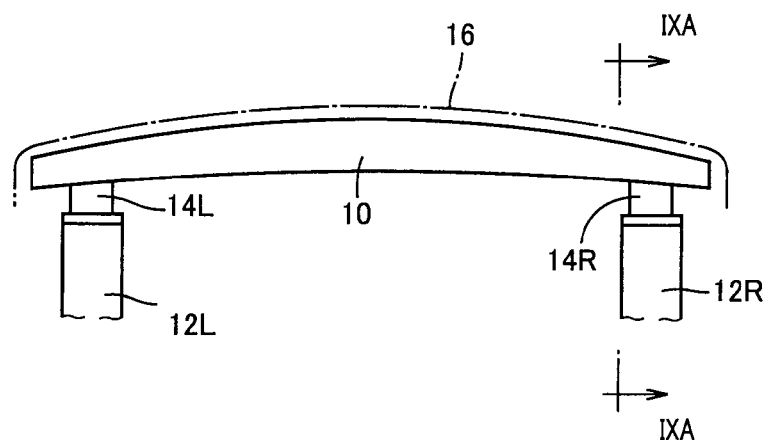
Figure 9B:
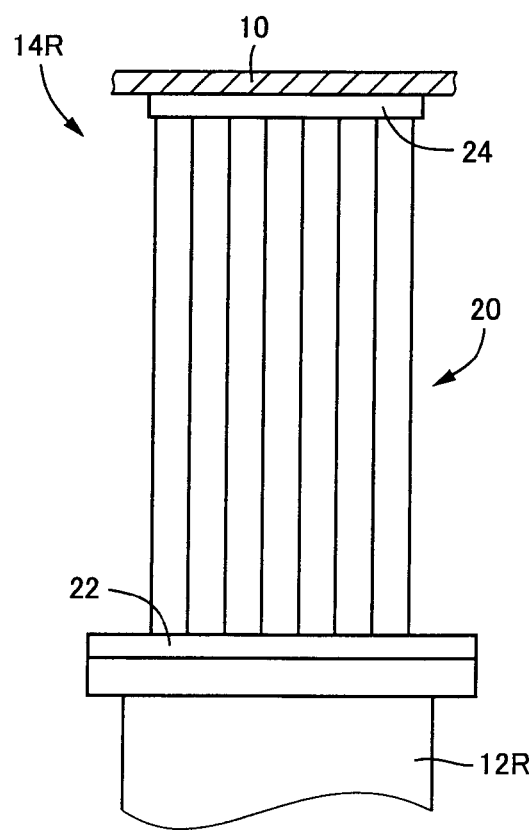
Figure 9C:
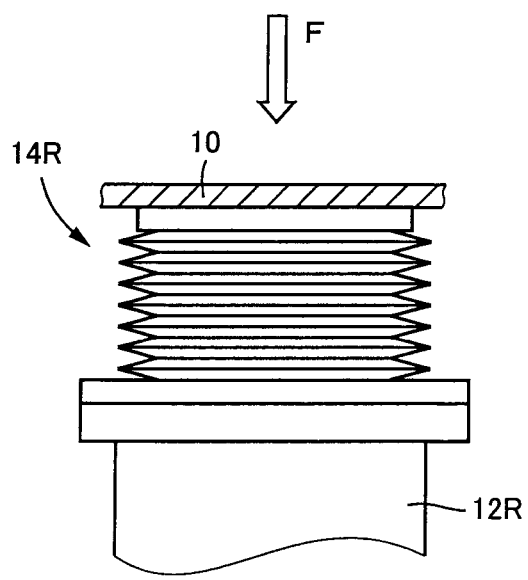
Figure 10A:
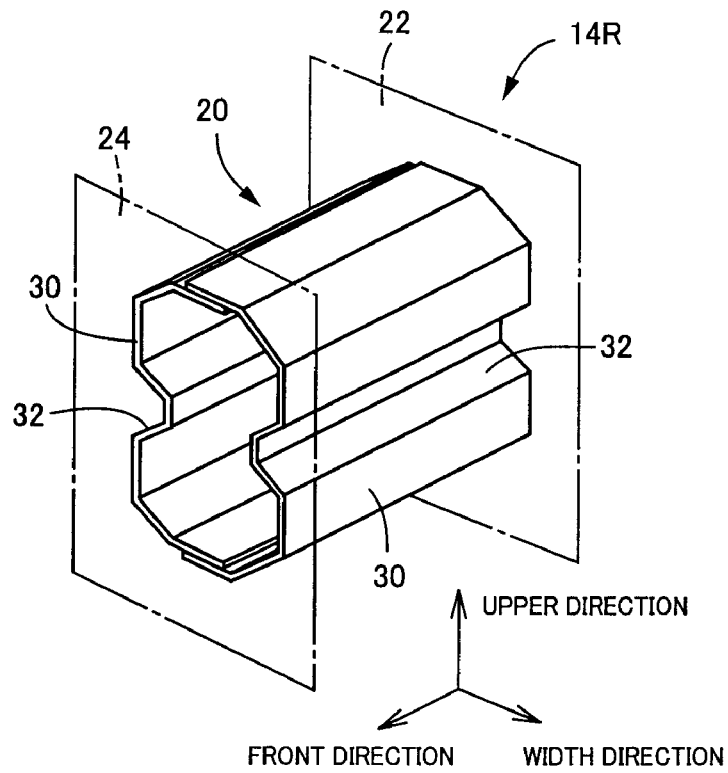
Figure 10B:
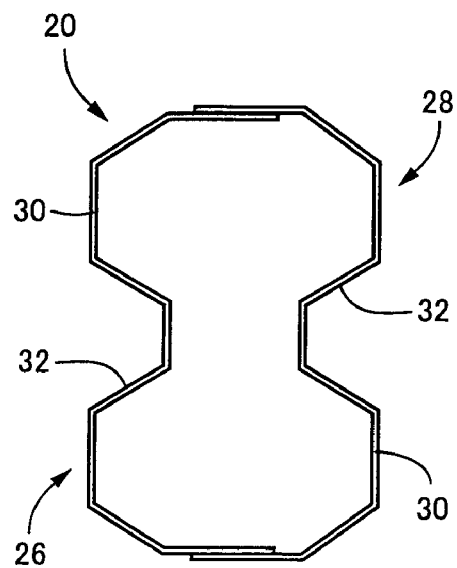

In FIGS. 1A, 1B and 1C, a crash box 50 is disposed between a side member 12R and a bumper beam 10 in place of the crash box 14R of the FIGS. 9A, 9B and 9C. The crash box 50 corresponds to an impact absorbing member for vehicle of the present invention. FIG. 1A is a plan view of the bumper beam 10 in the right half of the vehicle. The left half is constituted symmetrically about a center line. FIG. 1B is a perspective view of a body portion 52, and FIG. 1C is a front view of the same as seen from the axial direction. FIG. 1B and FIG. 1C correspond to FIG. 10A and FIG. 10B, respectively.

The crash box 50 comprises a body portion 52 having a tubular shape with a basic sectional shape of a flat octagon, and a pair of mounting plates 54 and 56 integrally weld-fixed to both axial ends (vertical ends in FIG. 1A) 52a and 52b of the tubular body portion 52, respectively. The crash box 50 is disposed between a side member 12R and a bumper beam 10, such that an axis of the body portion 52 is substantially parallel to an fore and aft direction (a vertical direction in FIG. 1A) of the vehicle. Via the mounting plates 54 and 56, the crash box 50 is integrally fixed to the side member 12R and the bumper beam 10 with bolts or the like (not shown).

Of both axial ends 52a and 52b of the body portion 52, the axial end 52a (one axial end) adjacent to the side member 12R i.e. the mounting plate 54, is perpendicular to the axis of the body portion 52. In this connection, the mounting plate 54 is substantially perpendicular to the axis of the body portion 52 to closely contact therewith over an entire edge thereof, and is fixed so as to closely contact with a front end surface of the side member 12R.

On the other hand, corresponding to the shape of the bumper beam 10, the axial end 52b (other axial end) of the body portion 52 adjacent to the mounting plate 56 is inclined relative to a direction perpendicular to the axial direction (fore and aft direction of the vehicle) of the body portion 52. Thus, the end 52b retracts toward (backward in FIG. 1A) the vehicle in a direction toward the longitudinal end (right end in FIG. 1A) of the bumper beam 10. Further, the mounting plate 56 is inclined to the axis of the body portion 52 to closely contact therewith over the entire end thereof, and is fixed so as to closely contact with the bumper beam 10. This inclination angle is determined depending on the shape of the bumper beam 10 to be about 10° to about 15°, for example.

When the crash box 50 receives a compressive load resulted from an impact applied to a vehicle front, it collapses like an accordion in the axial direction as shown in FIG. 9C, as with the crash box 14R described above. The deformation at this time allows the crash box 50 to absorb the impact energy, thus relieving the impact applied to the side member 12R and like structural members of the vehicle.

The body portion 52 has basically the same shape as the above-described body portion 20. Specifically, a section (corresponding to FIG. 1C) perpendicular to the axis of the tubular shape has a basic shape of an elongated shape having a pair of parallel longer sides. The paired parallel longer sides are obtained by linear interpolation (connection) between two adjoining sides (an octagonal shape formed by cutting off or trimming the four corners of a vertically elongated rectangle).

A pair of wider side wall portions 60a and 60b giving the pair of longer sides of the basic shape are provided with a pair of concave grooves 62, respectively, at a middle portion in the width direction i.e. the vertical direction (major axis direction) of the side wall portions in FIG. 1B and FIG. 1C. The paired concave grooves 62 are formed substantially symmetrically relative to the major axis L, and each concaves inward in the direction perpendicular to the axis of the tubular body portion 52. The paired concave grooves 62 are formed to extend parallel to the axial direction of the body portion 52 throughout the axial length thereof. As a result, the body portion 52 as a whole has an 8-shaped or gourd-shaped section.

This body portion 52 is disposed between the side member 12R and the bumper beam 10 such that the pairs of wider side wall portions 60a and 60b are located in the width direction of the vehicle (the left-right direction in FIG. 1A), that is, the longer sides (vertically extending right-hand and left-hand sides in FIG. 1C) are parallel to the vertical direction (vertical direction in FIG. 1B) of the vehicle. The body portion 52 may be integrally formed by, for example, hydrostatic forming using a tubular pipe material or the like.

However, in this embodiment, the body portion 52 is formed of a polygonal tube having a vertically elongated cross-sectional shape, obtained by integrally weld-fixing a pair of pressed plate materials 64 and 66 having been bent into an M shape with both circumferential sides of one pressed plate material being superposed on both circumferential sides of the other pressed plate materials. Although each of the wider side wall portions 60a and 60b is provided with a single concave groove 62 at the middle portion thereof in FIG. 1, a plurality of concave grooves 62 can be formed to be spaced apart in the width direction (vertical direction in FIG. 1B and FIG. 1C).

In the state where the impact absorbing member is mounted on the vehicle, of the pair of wider side wall portions 60a and 60b located in the width direction of the vehicle, the wider side wall portion 60a on the vehicle inner side (right side in FIG. 1B) is further provided with two projecting ribs 70 at an upper side and a lower side of the concave groove 62. The projecting ribs 70 each project outward (toward the right side in FIG. 1C) in the direction perpendicular to the axis, and extend in the axial direction (direction perpendicular to the sheet of FIG. 1C) of the body portion 52. The two projecting ribs 70 have the same structure. The projecting ribs 70 extend from the one axial end 52a adjacent to the mounting plate 54 i.e. the side member 12R, to be parallel to the axial direction of the tubular body portion 52 that is parallel to the concave groove 62, but they do not reach the other axial end 52b adjacent to the mounting plate 56 i.e. the bumper beam 10. In this embodiment, the projecting ribs 70 are formed over a length greater than half (e.g., about 50% to about 70%) the axial length of the tubular body portion 52.

The cross-sectional shape of the two, upper and lower projecting ribs 70 is, as obvious from FIG. 1C, a trapezoid with a width dimension (the vertical dimension in FIG. 1C) decreasing toward a projecting end. Further, as is obvious from FIG. 1B, a projecting dimension is substantially constant throughout the axial length thereof. However, a front end of each projecting rib 70 in the longitudinal direction, that is, the end at side of the mounting plate 56, is provided with a sloping surface 70a having a gradually decreasing projecting dimension. Such projecting ribs 70 may be formed, for example, by drawing simultaneous with formation of the body portion 52 by press-bending the pressed plate materials 64 and 66 made of rolled steel plates or the like into a desired shape.

Thus, in the crash box 50, of the pair of wider side wall portions 60a and 60b of the tubular body portion 52 located in the width direction of the vehicle, the wider side wall portion 60a located at the vehicle inner side is provided with projecting ribs 70 extending parallel to the axial direction from the axial end adjacent to the mounting plate 54. The projecting ribs 70 project outward in the direction perpendicular to the axis, and extend in the axial direction of the body portion 52. Therefore, even when the moment load is generated by the impact load applied to the crash box 50 in an oblique direction with respect to the vehicle (in this embodiment, the right front with respect to the vehicle in FIG. 1A), the existence of the projecting ribs 70 improves the strength and rigidity, thus preventing the crash box 50 from falling down laterally. Accordingly, excellent impact-absorbing properties are stably obtained.

Figure 2A:
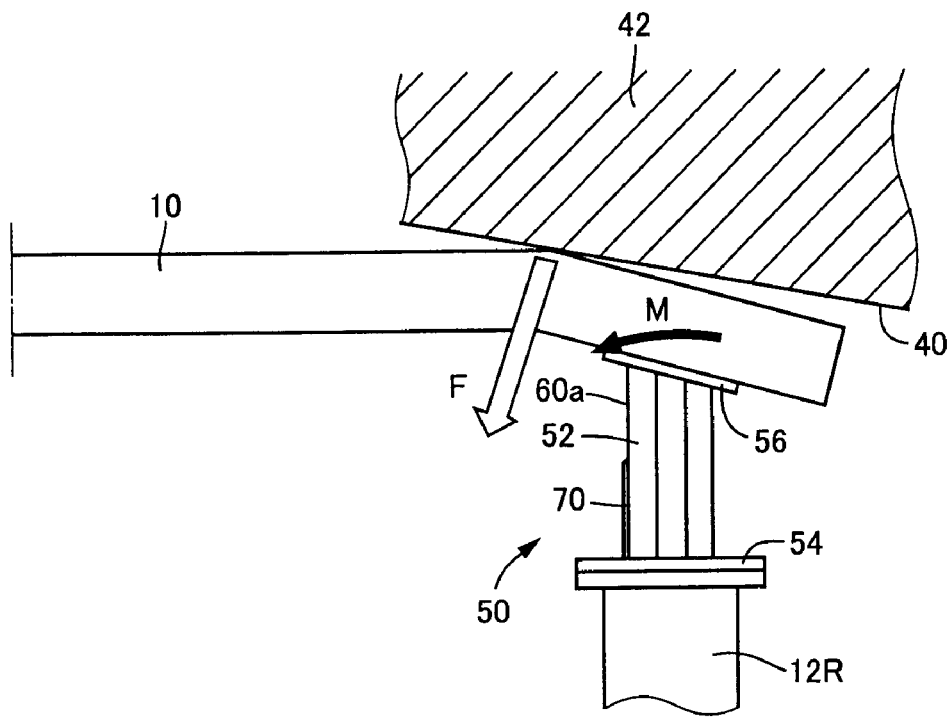
Figure 11A:
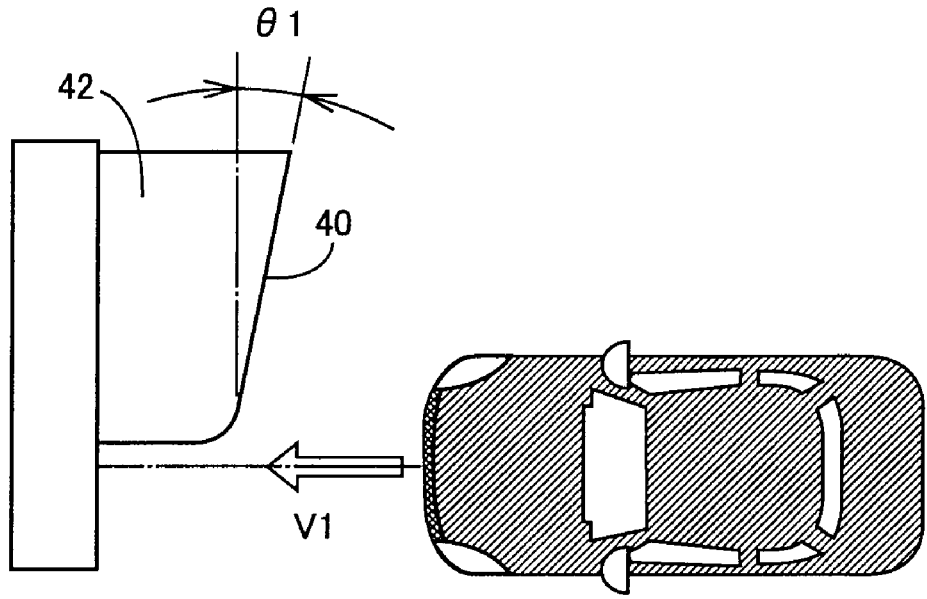
FIGS. 11A and 11B are figures explaining crash tests assuming collisions into a vehicle from oblique directions, in which FIG. 11A explains a crash test into a rigid barrier having a crash surface at a predetermined angle θ1, and FIG. 11B explains a crash test wherein a crash cart is crashed into the vehicle in a direction at a predetermined angle θ2.
Figure 11B:
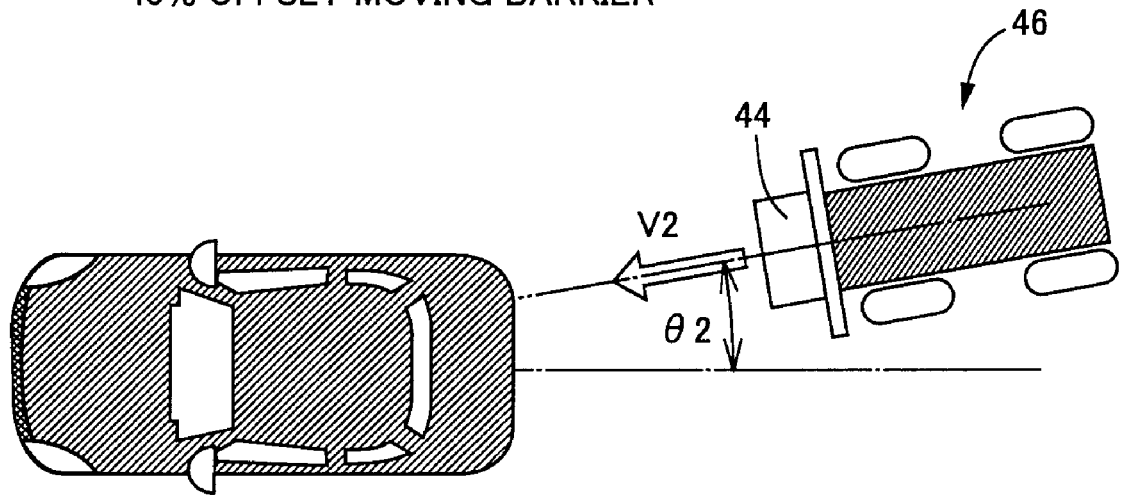
Figure 12:
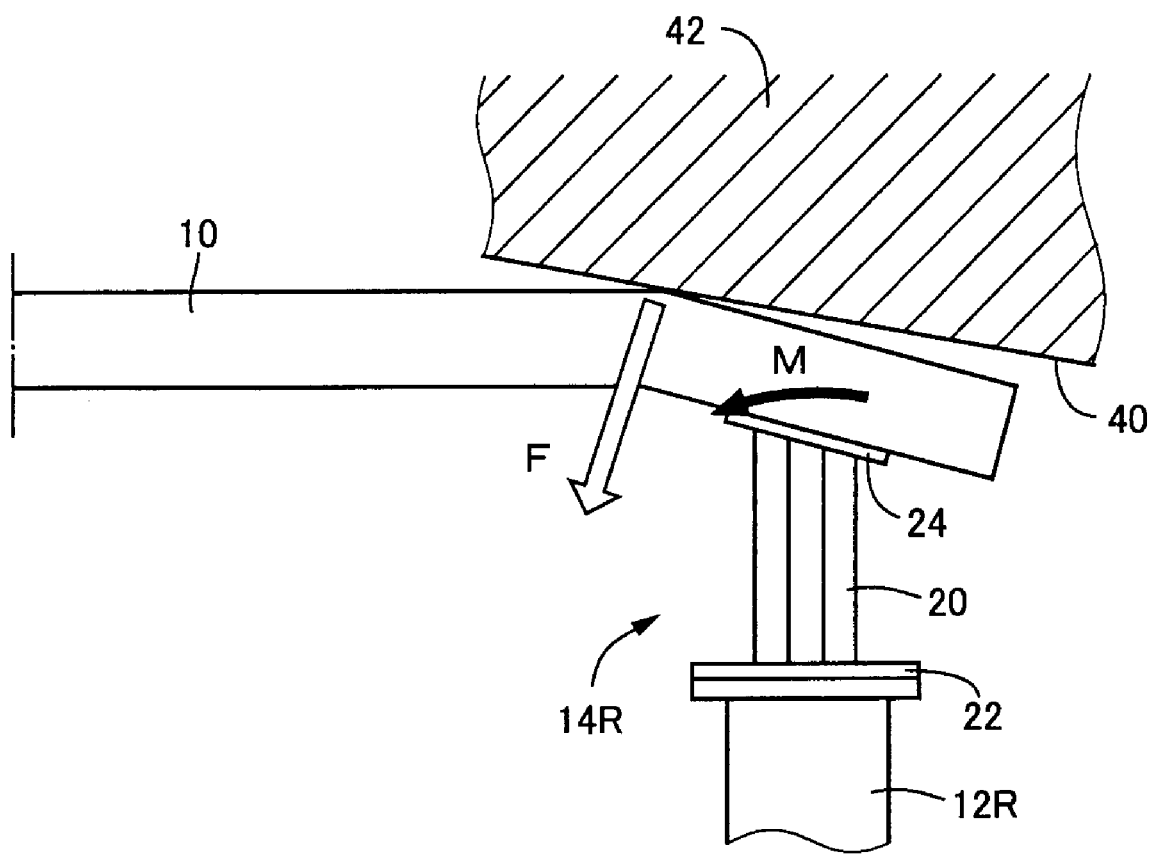
FIG. 12 is a figure explaining a moment load applied to the impact absorbing member for vehicle during the crash test of FIG. 11A.

For example, as shown in FIG. 2A, in the crash test using a rigid barrier 42 shown in FIG. 11A, when the inclined crash surface 40 causes a load F to act on the crash box 50 obliquely to the axial direction thereof, the crash box 50 receives a moment load M in a direction toward the vehicle inner side (the left-handed direction i.e. the counterclockwise rotation, in FIG. 2A). When such a counterclockwise moment load M is mainly generated, two projecting ribs 70 are formed only on the wider side wall portion 60a located on the left-hand side i.e. the vehicle inner side, as in this embodiment. This effectively prevents the crash box 50 from falling down laterally to thereby realize the excellent impact absorbing property stably.

Figure 2B:
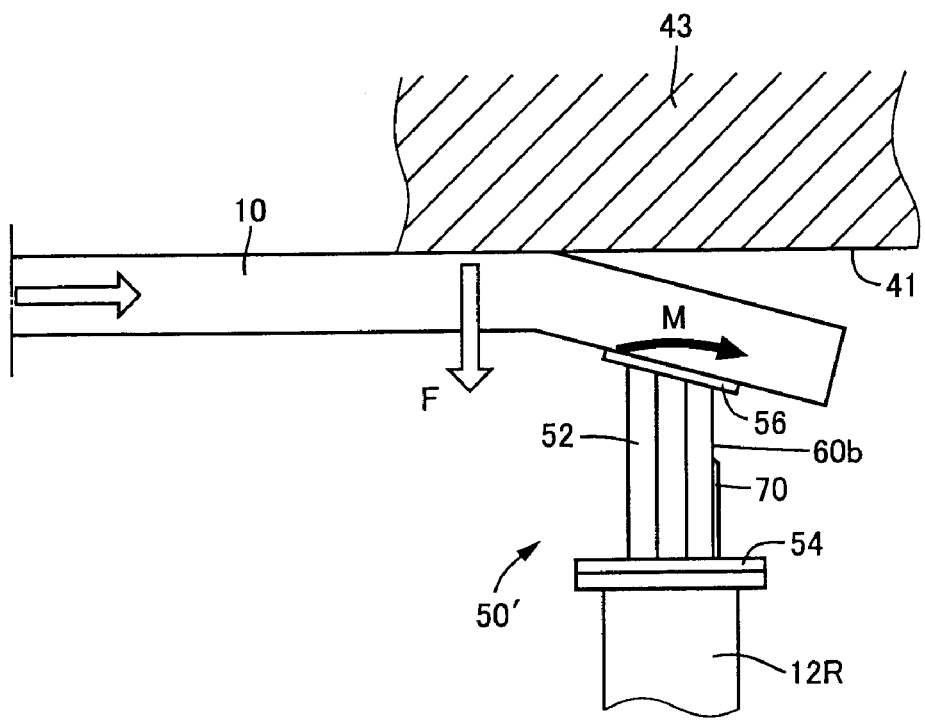

FIG. 2B shows a case where a conventional rigid barrier 43, having a crash surface 41 perpendicular to the crash direction, is used. In this case, depending on the shape and strength of the bumper beam 10, etc., the bended portion of the bumper beam 10 may be extended, which generates an outward moment load M in the opposite direction, i.e., toward the vehicle outer side (the clockwise direction in FIG. 2B). When such a clockwise moment load M is mainly generated, as shown in FIG. 2B, a crash box 50' can be employed, which is provided with a projecting rib 70 on the wider side wall portion 60b located on the right side, i.e., vehicle outer side in the width direction.

FIGS. 3A and 3B, FIGS. 4A to 4F, and FIGS. 5A and 5B show results of the crash test conducted using the crash box 50 of the present embodiment. The crash test was conducted using the 40% offset rigid barrier shown in FIG. 11A under conditions of angle $\theta1=10°$, and vehicle speed $V1=15$ km/h. The collapse process was simulated by the FEM analysis. Properties of the load and absorbed energy relative to the compression stroke were calculated.

Figure 3A:
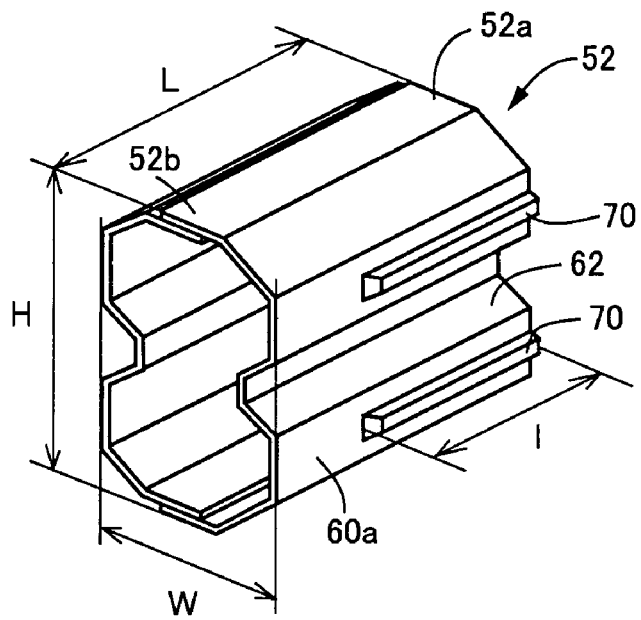
FIGS. 3A and 3B are figures explaining dimensions of components of the crash box used for FEM analysis, in which FIG. 3A and FIG. 3B correspond to FIG. 1B and FIG. 1C, respectively.
Figure 3B:
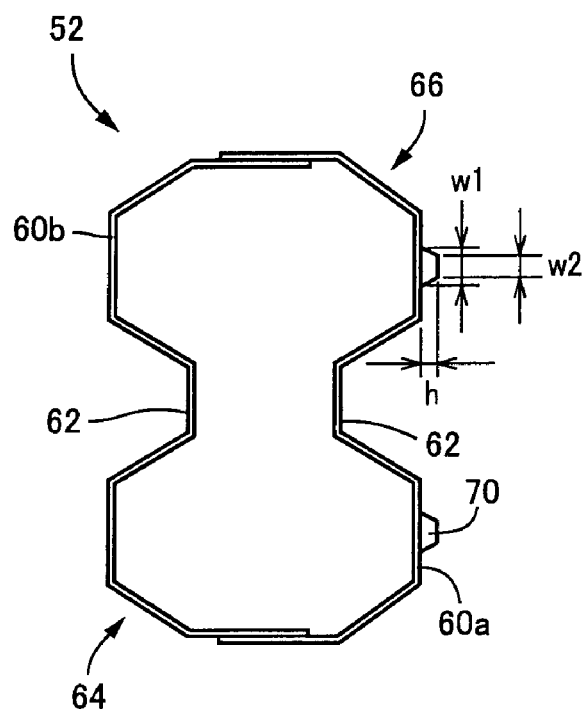

FIGS. 3A and 3B explain the dimensions of the components of the crash box 50 used for FEM analysis. The body portion 52 has a length L of 190 mm, a height H of 120 to 135 mm, and a width W of 60 mm. The projecting rib 70 has a length l of 110 mm, a base width w1 of 20 mm, a tip width w2 of 10 mm, and a height h of 5 mm. The height dimension H of the body portion 52 continuously decreases, i.e., gradually decreases, in a direction from the one axial end 52a adjacent to the mounting plate 54 (the side member 12R) toward the other axial end 52b adjacent to the mounting plate 56 (the bumper beam 10), within the above dimension range. The tensile strength of the pressed plate materials 64 and 66 is selected to be 440 MPa, and the plate thickness t thereof is selected to be 1.2 mm.

FIGS. 4A to 4F show a simulation result of collapse process by FEM analysis. As is obvious form these figures, in comparison with the above-described conventional product shown in FIGS. 13A to 13F, the crash box 50 of the present embodiment stays not falling down laterally until the last, and allows the collapse to properly progress in the axial direction.

Figure 5A:
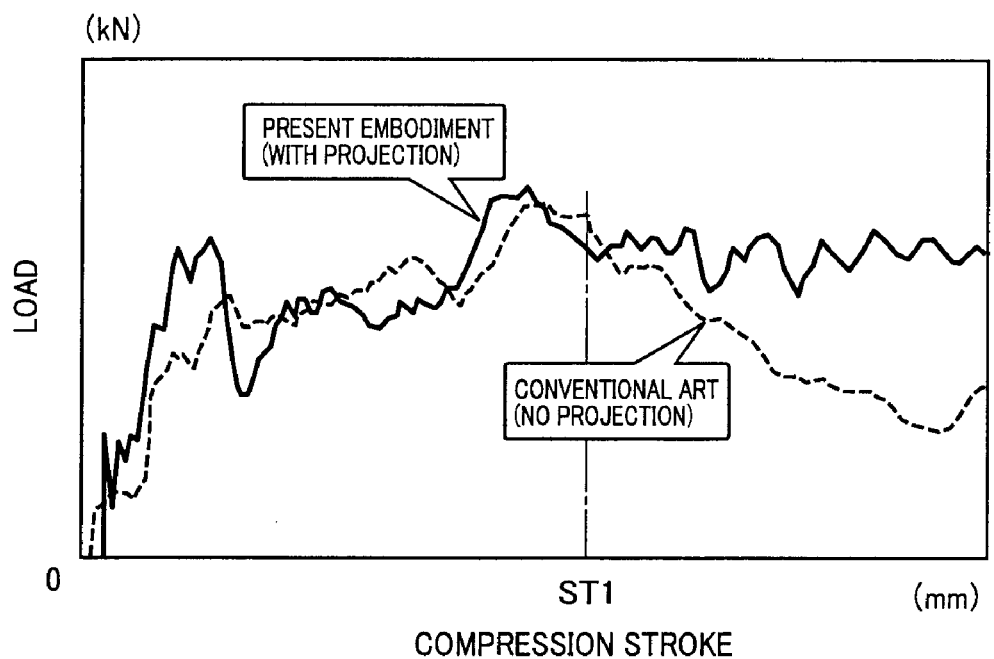
FIGS. 5A and 5B are figures showing the properties for changes in load and absorbed energy relative to the compression stroke obtained by FEM analysis, in comparison with a conventional product.
Figure 5B:
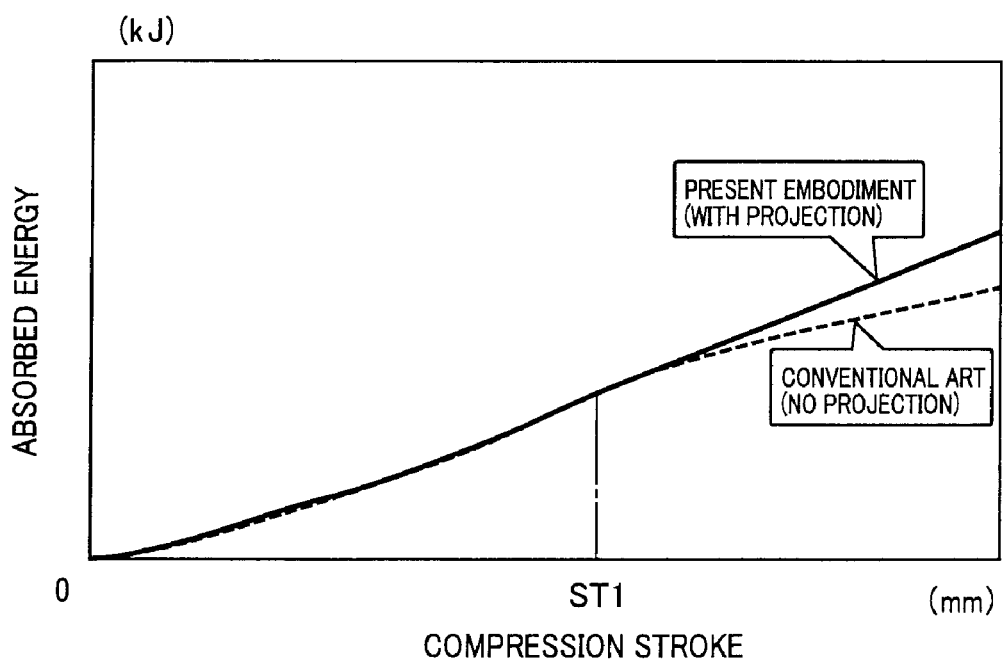

The solid lines in FIG. 5A and FIG. 5B show the load properties and absorbed energy properties, respectively, relative to the compression stroke concerning this embodiment. Unlike the conventional product indicated by dashed lines, the load shows no decrease during the compression stroke. A predetermined load is maintained until the final of the compression stroke, thus realizing the excellent absorbed energy properties. The absorbed energy of FIG. 5B is equivalent to the integration value of the load of FIG. 5A. With respect to a conventional product of which properties are indicated by dashed lines in FIGS. 5A and 5B and the simulation results are shown in FIGS. 13A to 13F, the dimensions of the components thereof are the same as with the crash box of the present embodiment, except only for the presence of the projecting ribs 70.

Figure 14A:
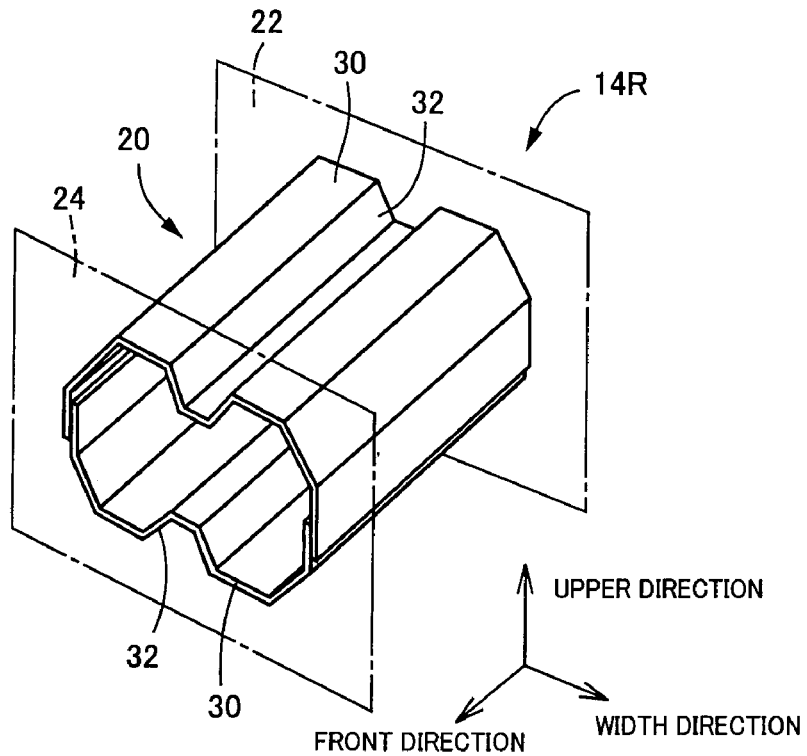
FIGS. 14A and 14B are figures explaining one example of a measure against falling down laterally by the moment load shown in FIG. 12, in which FIG. 14A explains the case of the impact absorbing member for vehicle being positioned sideways, and FIG. 14B explains the case of an auxiliary member being additionally employed.
Figure 14B:
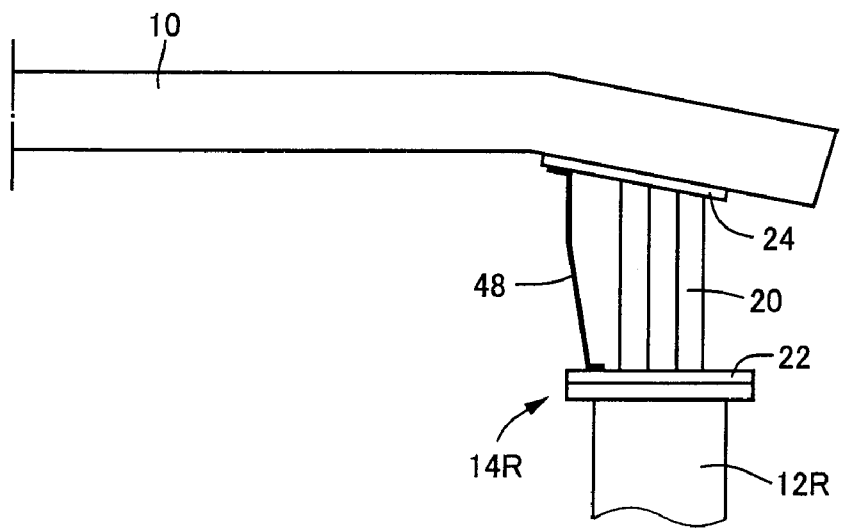

The present embodiment simply requires the formation of projecting ribs 70 by drawing in the part of the tubular body portion 52. Therefore, as compared with the conventional product shown in FIGS. 14A and 14B where the dimension of the body portion 20 in the width direction of the vehicle is increased, or the auxiliary member 48 is additionally provided to the body portion 20, problems such as the increase in the number of components of the crash box 50, the deterioration of mountability on the vehicle, the increase in weight, the reduction of productivity, and the like are alleviated or eliminated.

The projecting ribs 70 are axially formed on the body portion 52, such that they do not reach the side to which the load is input, that is, the other axial end 52b adjacent to the mounting plate 56 i.e. the bumper member 10, where the collapse starts. That is, no projecting rib 70 is formed at the axial end 52b adjacent to the mounting plate 56. Therefore, no load increase occurs in the crash initial stage, in which the body portion 52 starts collapsing from the axial end 52b adjacent to the mounting plate 56. Accordingly, impact-energy absorbing properties are well maintained.

In the first embodiment, the longitudinally tip end of each projecting rib 70, that is, the longitudinally tip end at side of the mounting plate 56, is provided with a sloping surface 70a having the gradually decreasing projecting dimension. This can prevent a sudden change in load at the time when the collapse induced by the compressive-load (compression stroke) progresses from the one axial end 52a of the body portion 52 to the tip end of the projecting rib 70. Accordingly, impact-energy absorbing properties are well maintained.

Other Embodiments

Other embodiments of the present invention are described hereinafter. In the following embodiments, the components substantially common to the above first embodiment are indicated with the same numerals, omitting detailed explanations.

Figure 6A:
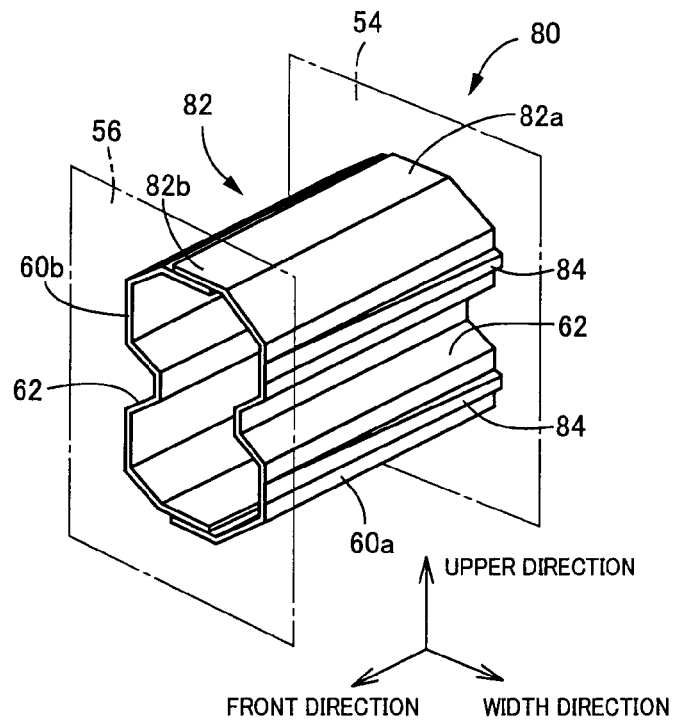
Figure 6B:
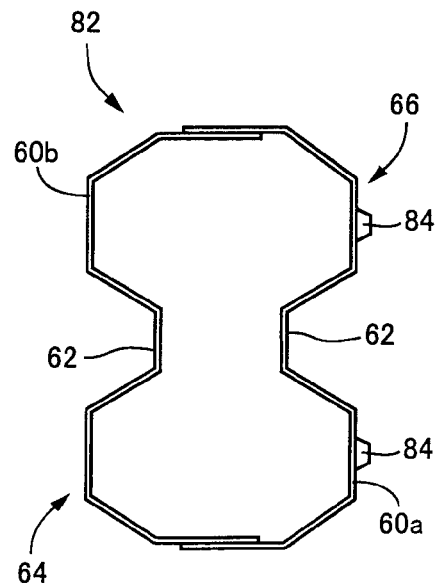

A crash box 80 according to a second embodiment shown in FIG. 6A and FIG. 6B is provided with two projecting ribs 84. The projecting ribs 84 are formed throughout the axial length of a tubular body portion 82. The projecting dimension continuously decreases from an axial end 82a toward an axial end 82b adjacent to the mounting plate 56 i.e. the bumper beam 10, reaching zero at the axial end 82b.

In this second embodiment, the gradual decrease in the projecting dimension of the projecting ribs 84 suppress a sudden change in compressive load upon collapse to well maintain the impact-energy absorbing properties. In addition, the existence of the projecting ribs 84 prevents the crash box 80 from falling down laterally by the moment load.

Figure 7:
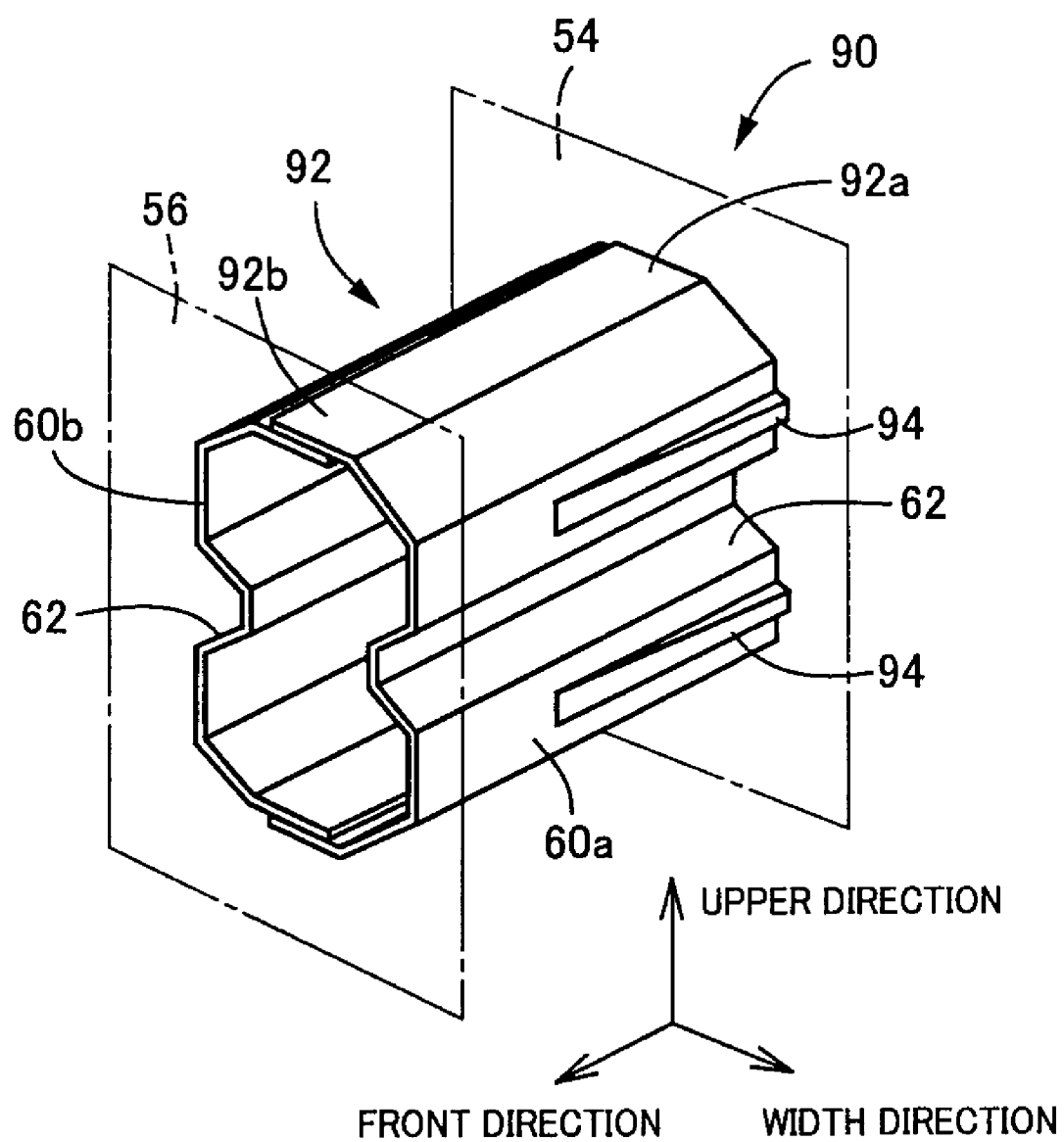
FIG. 7 is a figure explaining a still another embodiment of the present invention, showing a perspective view corresponding to FIG. 1B.

As with the projecting ribs 70 of FIGS. 1A, 1B and 1C, a crash box 90 according to a third embodiment shown in FIG. 7 is provided with projecting ribs 94. The projecting ribs 94 are formed on a tubular body portion 92, and extend to an axially middle portion. The projecting dimension of the projecting ribs 94 continuously decreases toward top or front end at side of the mounting plate 56 i.e. the bumper beam 10.

In this third embodiment, the gradual decrease in the projecting dimension of projecting ribs 94 prevents a sudden change in compressive load upon collapse to well maintain the impact-energy absorbing properties. In addition, the existence of the projecting ribs 94 prevents the crash box 80 from falling down laterally by the moment load.

Figure 8A:
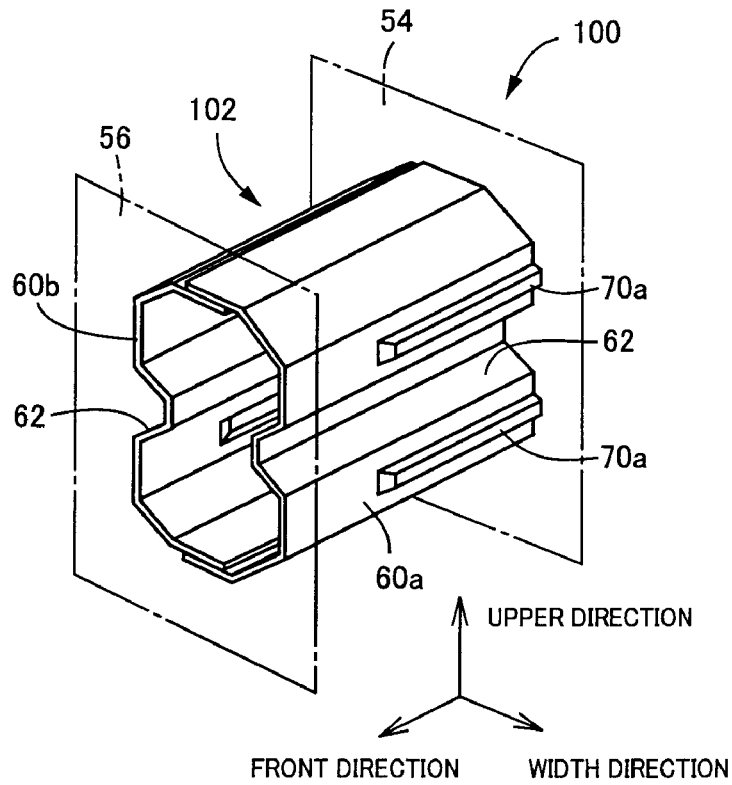
Figure 8B:
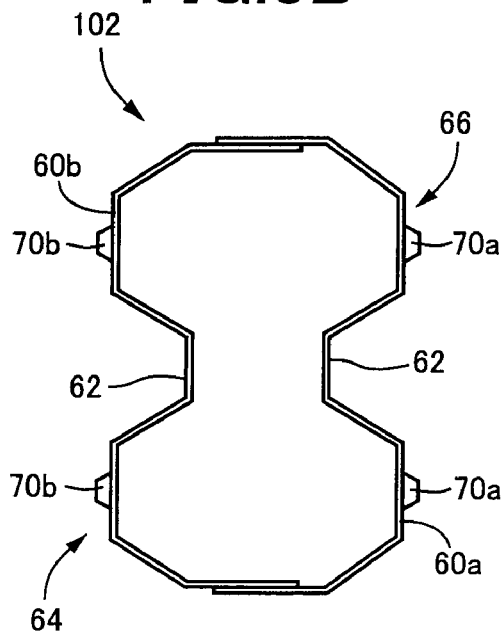

A crash box 100 according to a fourth embodiment shown in FIGS. 8A and FIG. 8B is provided with two sets of paired projecting ribs 70a and 70b. The projecting ribs 70a are formed on the right-hand wider wall portions 60a, and the projecting ribs 70b are formed on the left-hand wider side wall 60b, respectively, of a tubular body portion 102. Using such a crash box 100, the existence of the right-hand and left-hand projecting ribs 70a and 70b prevents the crush box from falling down laterally by the moment load even more effectively.

That is, the right-hand projecting ribs 70a and the left-hand projecting ribs 70b function effectively on the moment load M to the left as shown in FIG. 2A and also on the moment load M to the right as shown in FIG. 2B. As a result, regardless of the direction of the moment load M, the crash box is prevented from falling down laterally even more effectively, so that the predetermined impact-absorbing properties can be stably obtained. An embodiment provided with the above projecting ribs 84 or 94 in place of the projecting ribs 70a and 70b also achieve the same effects.

The above explains the embodiments of the present invention in detail based on the drawings. However, these are just illustrations of the embodiments, and various modifications and improvements are possible based on the knowledge of those skilled in the art.

What is claimed is:

1. An impact absorbing member for vehicle including a tubular body portion, the tubular body portion being provided with, at a part of a side wall thereof, a concave groove concaving inward in a direction perpendicular to an axis of the tubular body portion and extending parallel to an axial direction thereof, the impact absorbing member for vehicle, disposed between a vehicle body side member and a bumper member such that the axial direction of the tubular body portion is coincident with a fore and an aft direction of a vehicle, collapses like an accordion in the axial direction when receiving a compressive load to absorb an impact energy, characterized by that:

the tubular body portion is provided with, on the side wall located in a width direction of the vehicle, a projecting groove projecting outward in the direction perpendicular to the axis of the tubular body portion, the projecting groove extending parallel to the axial direction of the tubular body portion from one axial end adjacent to the vehicle body side member, without reaching other axial end adjacent to the bumper member.

2. The impact absorbing member for vehicle according to claim 1, wherein the projecting dimension of the projecting groove continuously decreases from the one axial end of the tubular body portion adjacent to the vehicle body side member toward the other axial end adjacent to the bumper member.

3. The impact absorbing member for vehicle according to claim 1, wherein the projecting dimension of the projecting groove is constant throughout the length thereof.

4. The impact absorbing member for vehicle according to claim 2, wherein the projecting groove extends over a length greater than half the axial length of the tubular body portion.

5. The impact absorbing member for vehicle according to claim 4, wherein the projecting groove is provided with, at a longitudinal tip end thereof, a sloping surface of which projecting dimension gradually decreases toward the other axial end of the tubular body portion adjacent to the bumper member.

6. The impact absorbing member for vehicle according to claim 1, wherein a section of the tubular body portion perpendicular to the axial direction has an elongated shape with a pair of longer sides approximately parallel to each other, a pair of wider side wall portions constructing the pair of longer sides are each provided with the concave groove at a middle portion in a width direction thereof, and the pair of wider side wall portions are located in a width direction of the vehicle.

7. The impact absorbing member for vehicle according to claim 6, wherein at least one of the pair of wider side wall portions is provided with the projecting groove at a part other than the concave groove.

8. The impact absorbing member for vehicle according to claim 7, wherein at least the one of the pair of wider side wall portions is located at an inner side of the vehicle.

9. The impact absorbing member for vehicle according to claim 8, wherein a wider side wall portion located at an outer side of the vehicle is also provided with the concave groove and the projecting groove.

10. The impact absorbing member for vehicle according to claim 2, wherein a section of the tubular body portion perpendicular to the axial direction has an elongated shape with a pair of longer sides approximately parallel to each other, a pair of wider side wall portions constructing the pair of longer sides are each provided with the concave groove at a middle portion in a width direction thereof, and the pair of wider side wall portions are located in a width direction of the vehicle.

11. The impact absorbing member for vehicle according to claim 10, wherein at least one of the pair of wider side wall portions is provided with the projecting groove at a part other than the concave groove.

12. The impact absorbing member for vehicle according to claim 11, wherein at least the one of the pair of wider side wall portions is located at an inner side of the vehicle.

13. The impact absorbing member for vehicle according to claim 12, wherein a wider side wall portion located at an outer side of the vehicle is also provided with the concave groove and the projecting groove.

14. The impact absorbing member for a vehicle according to claim 1, wherein the projecting groove further comprises first and second projecting grooves, each of the first and second projecting grooves provided on a same side wall of a tubular body portion, the side wall being selected according to a selected direction of application of a crash load to the impact absorbing member.

* * * * *